Feb. 27, 1968 C. W. NEWELL 3,370,803
TAPE TRANSPORT APPARATUS AND ROLL THEREFOR
Filed Aug. 17, 1965 5 Sheets-Sheet 1
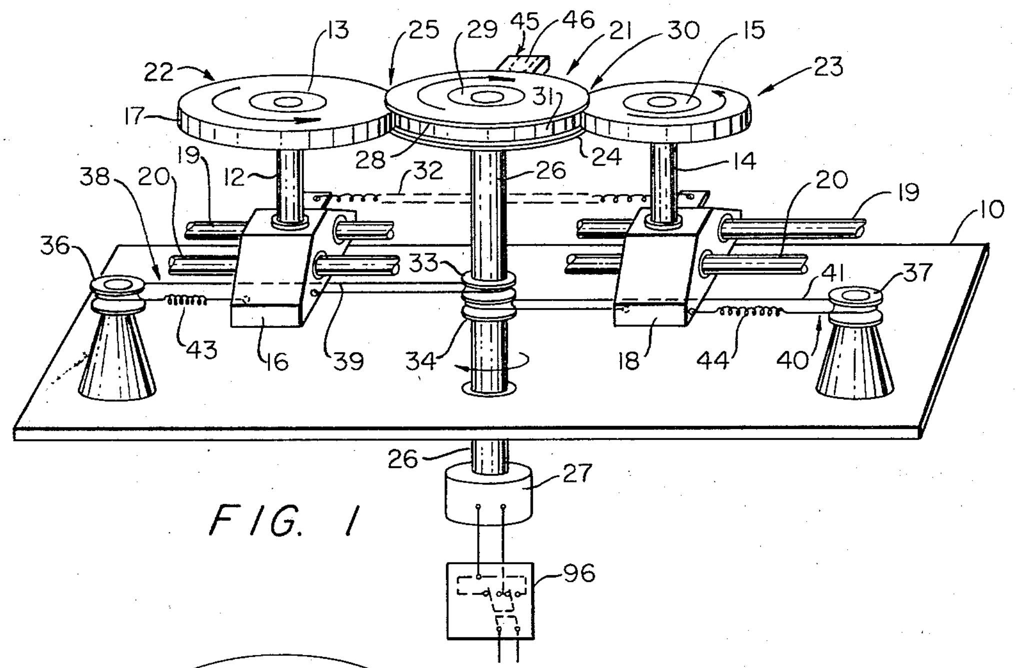
FIG. 1
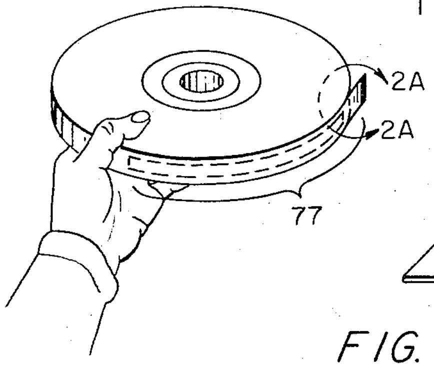
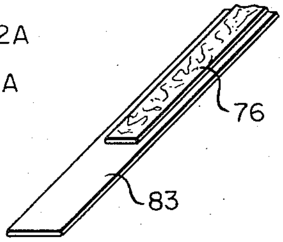
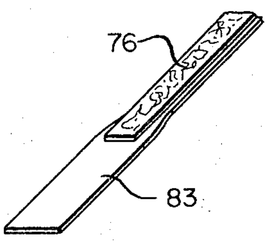
FIG. 3 FIG. 4
FIG. 2
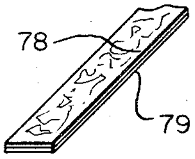
FIG. 5A
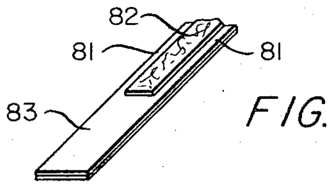
FIG. 5B
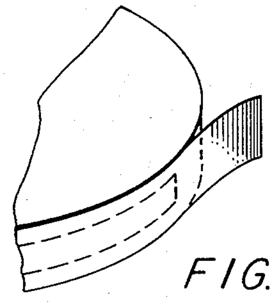
FIG. 2A
INVENTOR.
CHESTER W. NEWELL
BY
Flehr and Swain
ATTORNEYS

TAPE TRANSPORT APPARATUS AND ROLL THEREFOR

Filed Aug. 17, 1965 5 Sheets-Sheet 2

INVENTOR.
CHESTER W. NEWELL
BY
Flehr and Swain
ATTORNEYS

INVENTOR.
CHESTER W. NEWELL
BY
Flehr and Swain
ATTORNEYS

TAPE TRANSPORT APPARATUS AND ROLL THEREFOR

Filed Aug. 17, 1965 5 Sheets-Sheet 4

INVENTOR.
CHESTER W. NEWELL
BY
Flehr and Swain
ATTORNEYS

TAPE TRANSPORT APPARATUS AND ROLL THEREFOR

Filed Aug. 17, 1965 5 Sheets-Sheet 5

INVENTOR.
CHESTER W. NEWELL
BY
Flehr and Swain
ATTORNEYS

United States Patent Office 3,370,803
Patented Feb. 27, 1968

3,370,803

TAPE TRANSPORT APPARATUS AND ROLL THEREFOR

Chester W. Newell, San Jose, Calif., assignor to Newell Associates, Inc., Sunnyvale, Calif., a corporation of California Filed Aug. 17, 1965, Ser. No. 480,324
37 Claims. (Cl. 242—55.12)

ABSTRACT OF THE DISCLOSURE

A recording tape roll of the type employing pliable material is formed in a manner characterized by its structural strength sufficient to retain its physical form without side support. The roll of tape includes a tension profile with little or no slope to provide substantially uniform tension in the convolutions of the roll over a major radial extent. The roll is further characterized by a leader portion which carries an elongated strip of adhesive material serving to seal the roll. The outer tip end of the leader portion is unadhered and free to extend naturally away from the roll in order to be picked up by means serving to peel the leader away from the tape roll when the roll is threaded through apparatus for feeding the tape from supply to take-up rolls.

The roll is wrapped by a method utilizing steps of drawing the tape from the supply roll while, at the point of departure of tape from the supply roll, the tape is placed in facial engagement with a resilient annular surface and the annular surface is moved continuously substantially with the tape at the point of departure while the supply roll and the annular surface are urged together with a predetermined force. A take-up hub is also arranged to receive the leader portion of the tape roll as by attaching the tape to the hub so as to initiate formation of the take-up roll. The tape is then pressed against the take-up hub and with a force greater than the predetermined force existing between the supply roll and the resilient annular surface.

Further, a tape transport apparatus feeds tape from a supply roll to a take-up roll. In the transport a means for peeling the tape leader from the roll serves to provide self-threading of each roll of tape as it is initially fed into the machine.

Several embodiments of the transport are shown: (a) The rolls advance and retreat relative to a rotating drive capstan; (b) The rolls are mounted on swing arms which carry the tape rolls as they advance and retreat relative to the capstan; (c) The axis of rotation of the supply roll, the take-up roll, and a rotating drive capstan all remain fixed while idler rollers move into and out of the enlarging and diminishing gap defined between the rolls and the capstan.

SPECIFICATION

This invention relates to tape transport apparatus and is particularly useful as a magnetic recording tape transport apparatus to form and utilize self-supporting platter-like tape rolls. Tape rolls prepared by the apparatus, can be handled, for example, without harm in a manner similar to that of solid disc records notwithstanding the lack of protective side flanges on the rolls.

In general, the usual coiled magnetic recording tape requires flanges or like means in order to protect the coil of tape.

I have discovered, and disclose herein, an apparatus and method whereby a pliable recording tape can be wrapped in a manner wherein the roll is characterized by extraordinary structural strength in retaining its physical form without side support and in a manner providing exceptional evenness of lay whereby the tape edges form a smooth planar surface to the side of the roll. Therefore, flanges can be omitted from the rolls of tape without exposing the tape edges to scuffing or the record surface margins to dirt, grit or other deleterious condition. The roll is virtually self-sealed against the elements.

The tape roll is characterized by a unique "tension profile" which manifests disc-like packing of the convolutions of the roll without harm to the tape. The "tension profile" of the roll can be defined as the curve or trace developed by plotting tension in each convolution against radial displacement thereof from the center of the roll.

In view of the disc-like character of the roll, it can be accelerated and decelerated at extreme rates using edge driving techniques rather than by torque motors without danger of introducing a cinched or pressure wrinkled convolution of tape into the roll. Thus, the roll of tape can be quickly accelerated to great speed and employed to advantage in longitudinally recording video frequencies, for example. By driving the tape from its edge, mechanisms for servoing of applied torques at the supply and take-up reels can be completely replaced by a mere drive capstan which can apply extremely high acceleration and deceleration to the tape.

The structural strength of the roll is believed derived from compaction of the convolutions upon each other in a direction radially of the roll so as to provide the characteristic "tension profile" mentioned. Notwithstanding the radial compaction, and "solidification" of the roll, however, the tape is further characterized by a lack of any perceptible permanent deformation whereby repeatable performance can be assured.

Although the tape transport apparatus as disclosed herein is characterized by the production of a unique platter-like roll of tape which is gently though accurately handled with respect to a transducer, the tape transport apparatus entails a number of significant additional advantages as will be pointed out further below.

In general it is an object of the present invention to provide an improved tape transport apparatus.

Another object of the invention is to provide tape transport apparatus for forming and utilizing tape rolls having a unique tension profile imparting disc-like characteristics thereto.

Another object of the invention is to provide a roll of elongated recording tape wherein the record surface is virtually sealed against exposure to the elements under action of the compacted convolutions without deleterious deformation of the tape.

A further object of the invention is to provide a tape transport apparatus for magnetic recording, employing a simple construction utilizing an economy of parts and components.

Yet another object of the invention is to provide a roll of pliable, plastic base material whereby the roll is characterized by an evenness of lay providing smooth, flat sides formed by the aligned edges of the convolutions of the roll so as to eliminate possible exposure of any convolution to destructive elements and conditions.

A further object of the invention is to provide a tape transport apparatus and tape roll therefor whereby automatic self-threading of the leading end of a roll of tape is accomplished in simple fashion.

Yet another object of the invention is to provide a tape transport apparatus for forming rolls of tape wherein the tape is subjected to a minimum of elongating forces during transfer of a length of tape from a supply to a take-up roll.

An additional object of the invention is to provide a tape transport apparatus for forming the aforementioned characteristic rolls in both a forward and reverse driving mode, whereby the roll of tape can be fed in each of two opposite directions while preserving the roll characteristics.

It is a still further object to provide a bi-directional tape transport of a type for providing the aforementioned rolls with means which inherently and naturally reverses the application of control forces applied to the apparatus responsive merely to reversal of the transport drive motor.

These and other objects of the invention will be more clearly apparent from the following detailed description of preferred embodiments when considered in conjunction with the accompanying drawings in which:

FIGURE 1 is a schematic perspective view of tape transport apparatus according to the invention;

FIGURE 2 is a view which shows a roll of recording tape characterized by evenness of lay producing smooth alignment between convolution edges and planar structural strength to retain its physical form;

FIGURE 2A is an enlarged detail view of a portion of FIGURE 2;

FIGURE 3 is a perspective view showing the outer end of a leader portion of a tape provided with means for adhering the outermost convolution of tape to its roll;

FIGURE 4 is another embodiment of the leader portion of FIGURE 3;

Figure 6:
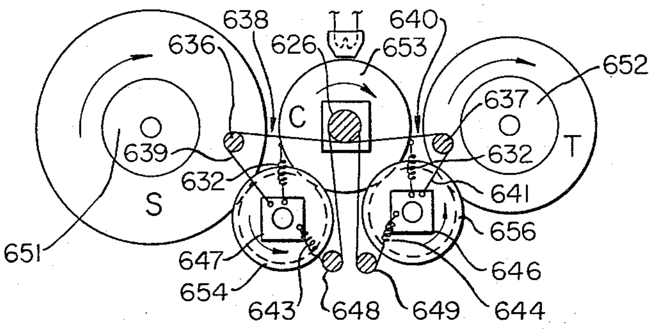
Figure 7:
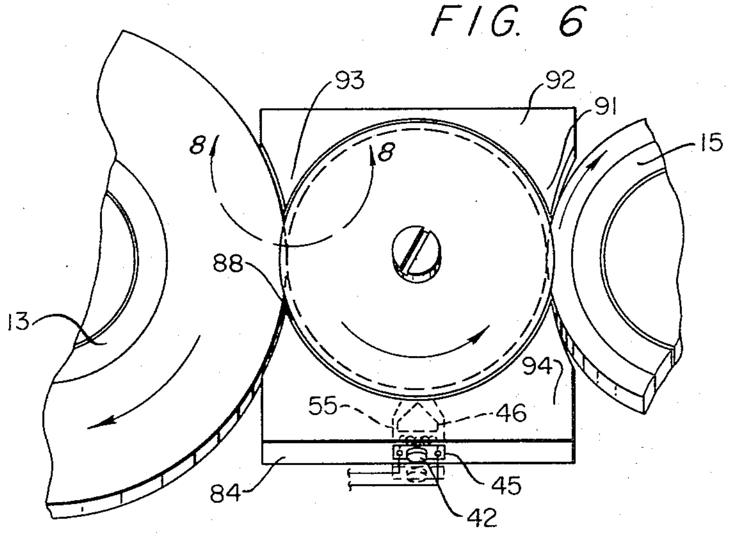
Figure 8:
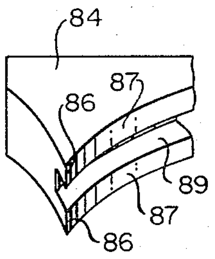
Figures 9, 10:
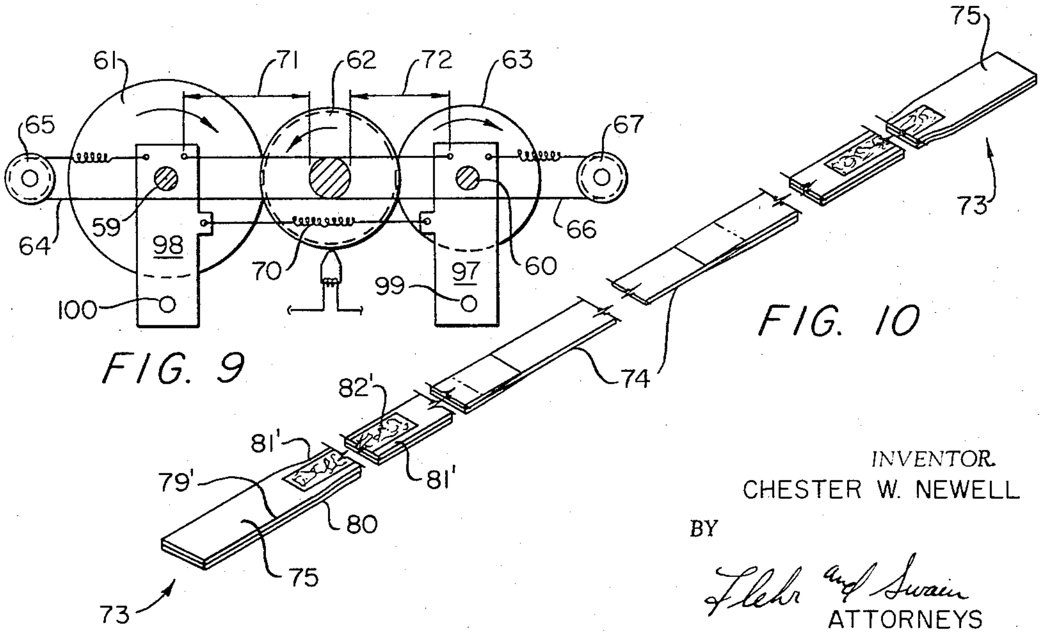
Figure 11:
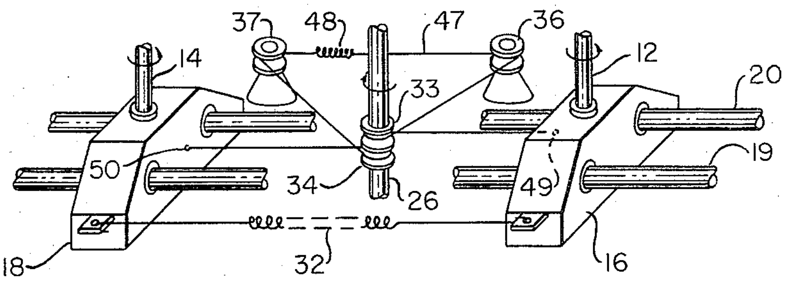
Figure 12:
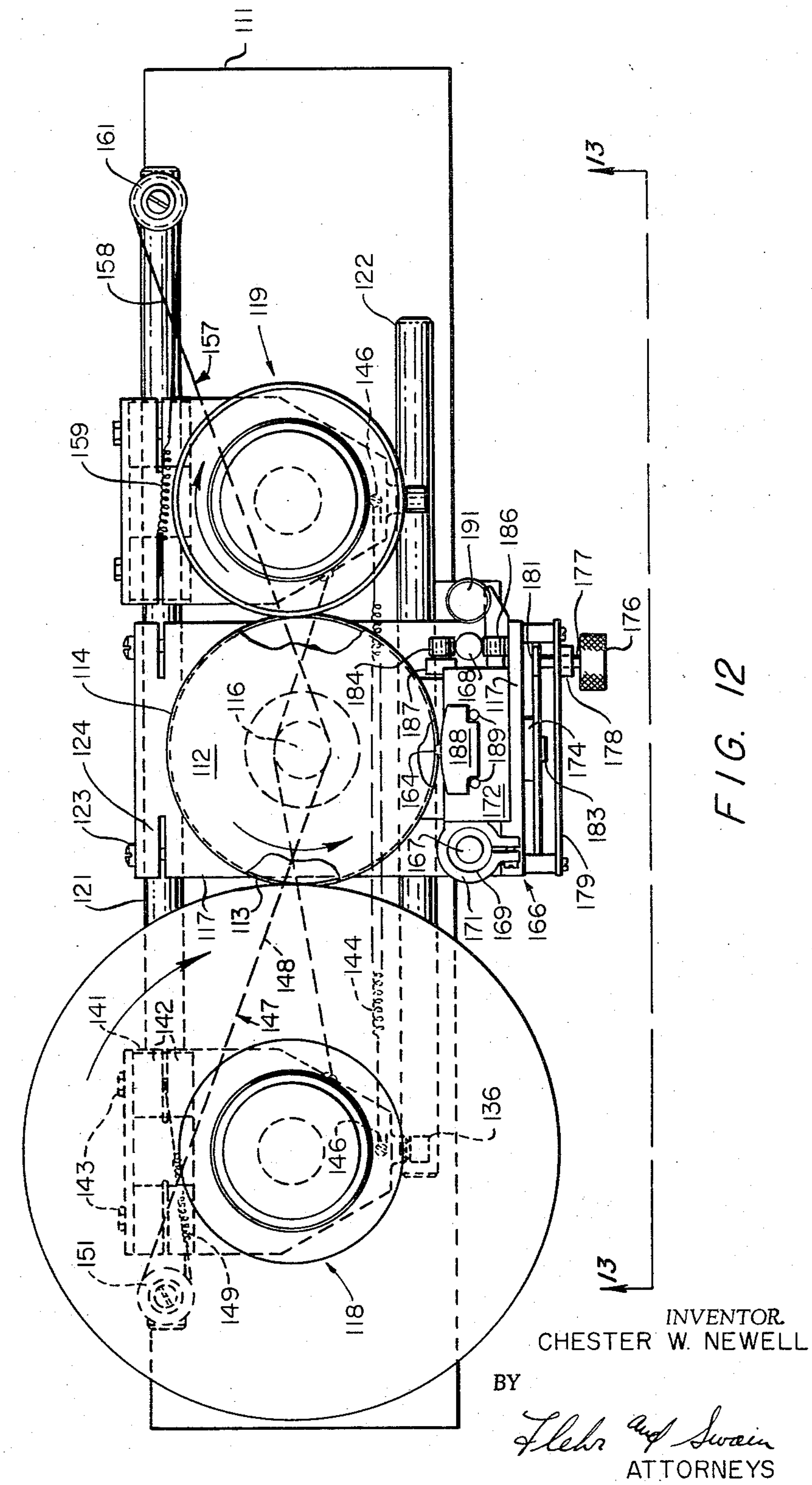
Figure 13:
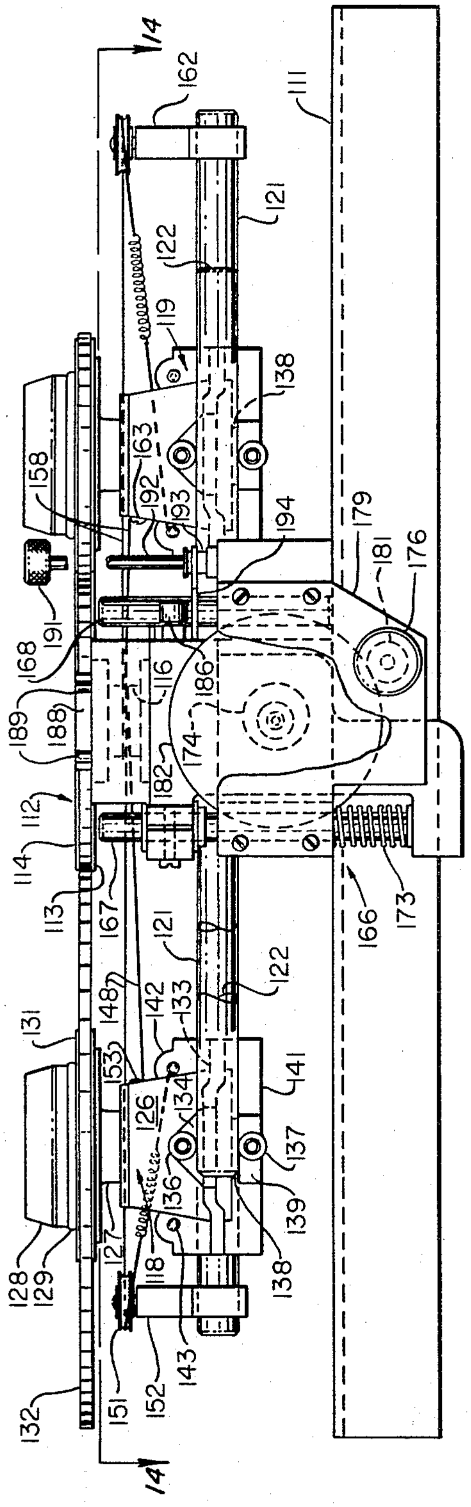
Figure 14:
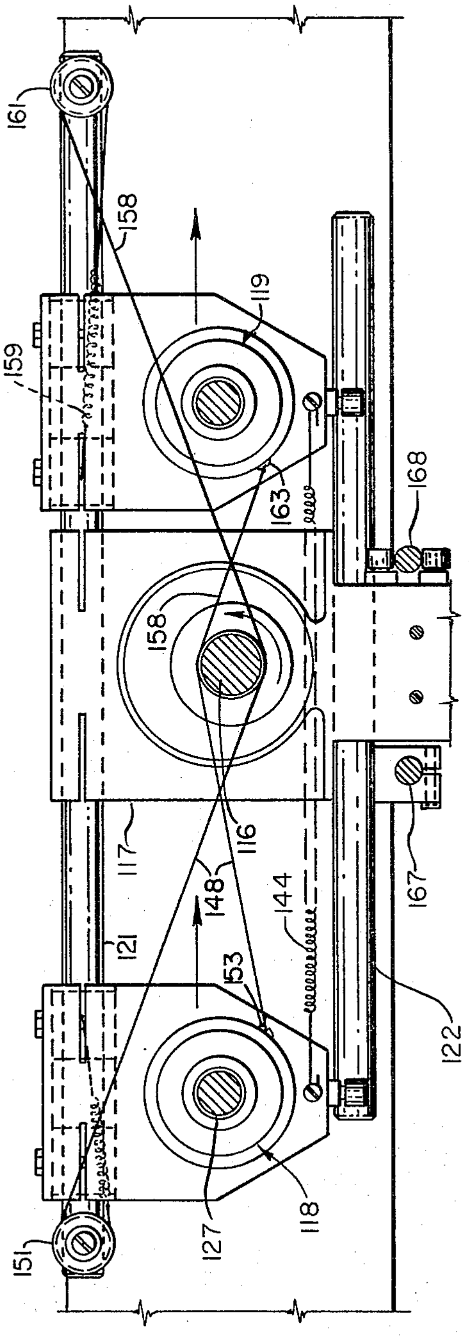

FIGURES 5A and 5B respectively are views which show an early and final stage in the manufacture of another embodiment of the leader portion of FIGURE 3;

FIGURE 6 is a schematic diagram in plan of another embodiment of the invention;

FIGURE 7 is a schematic perspective view from above showing an embodiment adapted for self-threading of tape from a supply to a take-up roll;

FIGURE 8 is an enlarged detailed view of a portion of FIGURE 7 taken along the line 8—8;

FIGURE 9 is a diagrammatic plan view of another embodiment of the apparatus shown in FIGURE 1;

FIGURE 10 is a perspective view which shows another embodiment of a leader portion of the tape;

FIGURE 11 is a view which diagrammatically shows another embodiment wherein the differential forces are applied using a friction band;

FIGURES 12, 13, 14 are views which show the detailed construction of another embodiment, the figures being respectively front elevation, bottom plan and sectional front elevation views.

Figure 16:
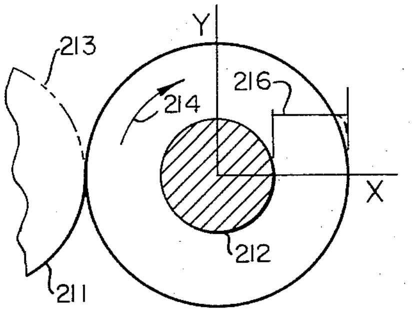
Figure 15:
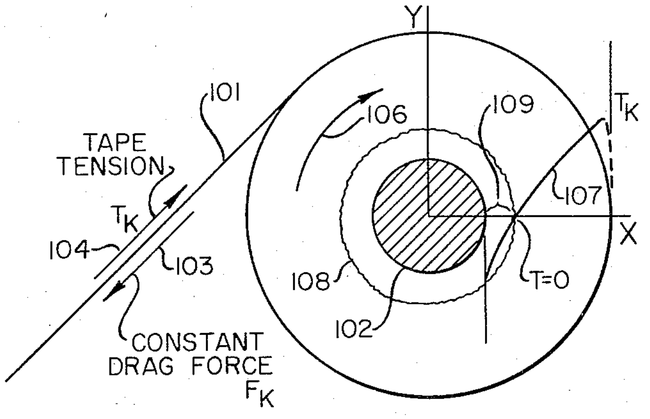
Figure 17:
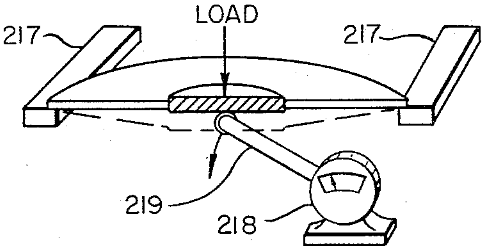
Figure 18:
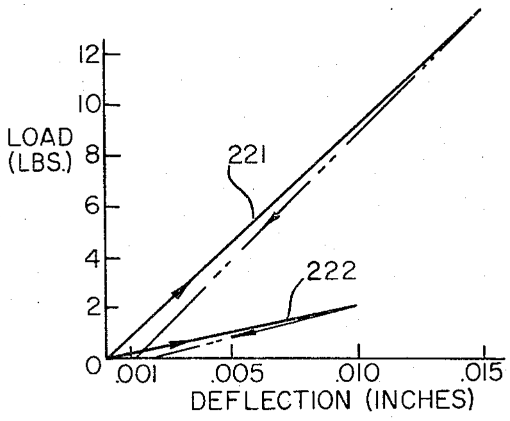

FIGURES 15 and 16 are diagrams of the tension profile respectively of conventional and novel rolls of tape;

FIGURE 17 is a diagram of a test procedure for testing self-supporting characteristics of a roll; and FIGURE 18 is a graph plotted from the test procedure of FIGURE 17.

Generally, FIGURE 1 shows a tape transport of the type adapted to support a length of conventional pliable recording tape wrapped to form supply and take-up rolls. There is provided means for supporting each of the rolls for independent rotation. Drive means are adapted to support and feed the tape from the supply to the take-up roll. The drive means includes a capstan having a resilient peripheral surface disposed and adapted for cooperative driving engagement with the periphery of the supply and take-up rolls at the point of departure of tape from the supply roll and at the point of tape arrival at the take-up roll. The resilient capstan surface is maintained in continuous contact with the tape throughout that zone of tape movement which extends from its point of departure from the supply roll to its point of arrival at the take-up roll.

Means are provided which, during transfer of the complete roll of tape through the foregoing zone, are active to develop a compressive force between the supply roll periphery and the capstan at the point of tape departure and between the take-up roll and capstan at the point of tape arrival. The compressive force is greater at the point of arrival. The foregoing means is inherently and naturally reversible in response to a reversal of the tape drive mode. Thus, as the point of arrival alternates with the point of departure depending upon forward or reverse mode of operation, the compressive forces developed in conjunction with the capstan shall inherently and naturally be greater at the point of arrival.

At the point of departure where the tape transfers onto the capstan, edge guiding means provide a registration surface which serves to engage and register, in a predetermined plane, an edge of the outermost plurality of adjacent convolutions of tape during tape transfer at that point. Likewise at the point of, and during, arrival of tape onto the take-up roll, guide means are effective to provide a registration surface engaging and registering in a predetermined plane an edge of the outermost plurality of adjacent convolutions of tape of the take-up roll. A second registration surface opposes the first and serves to engage the other edge of the tape at the points of departure and arrival and resiliently urges the tape against the first registration surface. (As shown in FIGURE 1 the first and second registration surfaces are preferably in the form of a pair of flanges carried on the drive capstan, one being spring-loaded toward the other.)

The foregoing general description may now be described in more particular detail by referring to the schematic arrangement in FIGURE 1.

Means are provided forming a base or frame such as the platform 10. A pair of spindles 12, 14 support supply and takeup hubs 13, 15 respectively, which are mounted for independent rotation. A length of conventional pliable plastic base recording tape 17 is formed upon hub 13 for feeding to hub 15 and return. As shown in FIGURE 1, tape 17 has been partially wound about take-up hub 15. Spindles 12 and 14 are mounted for movement along a predetermined line of travel whereby the periphery of the supply and take-up rolls 22, 23 can be maintained in continuous contact with a drive capstan 21 notwithstanding progressively changing diameters of the rolls during tape transfer.

Spindles 12, 14 are respectively journalled in a pair of traveling carriages 16, 18. Carriages 16, 18 are supported to move on roller bearings (not shown) along a pair of ways defined by stationary rods 19, 20. Frame means (not shown) are provided in actuality to support rods 19, 20 from the platform 10.

Drive capstan assembly 21 is interposed between supply roll 22 and take-up roll 23 to drive both rolls by peripheral engagement. Capstan assembly 21 includes a resilient peripheral drum surface 31 bounded by flanges 24, 28. Flange 24 is fixed for rotation upon a drive shaft 26 driven by a reversible motor 27. Flange 28 is also supported for rotation with shaft 26 and is spring loaded for movement of limited extent toward flange 24. A circular diaphragm spring 29 serves to urge flange 28 toward flange 24 whereby opposed flanges continuously engage opposite edges of the tape. Thus, the confronting surfaces of flanges 24, 28 are spaced to receive and engage the opposite edges of tape 17 therebetween.

Tape from supply roll 22 transfers onto the peripheral drum surface 31 of capstan assembly 21 at the point of departure 25 of tape 17 from supply roll 22. Drum surface 31 provides continuous facial contact with the tape throughout that zone of tape movement extending from the point of departure 25 to the point of tape arrival 30 upon take-up roll 23. At no point, therefore, does the tape constitute an unsupported open filament. One edge of the outermost plurality of convolutions of tape registers with the inner face flange 24 in a predetermined plane at the point of transfer onto capstan assembly 21. The upper edge is engaged by the resiliently urged flange 28 so as to yieldingly maintain positive registration of the lower edge of tape 17 with flange 24.

It is to be appreciated that the point of tape departure 25 from the "supply" roll and point of tape arrival 30 at the "take-up" roll are designated only after the direction of rotation of capstan 21 is known. In FIGURE 1 directional arrows have therefore been applied. However, it will be apparent that operation of capstan 21 in a reverse mode will cause the points of departure and arrival as designated in FIGURE 1 to be reversed and that for each successive tape transfer operation these points as designated will alternate as will the designation of the rolls as "supply" and "take-up" rolls. The following description, however, will proceed on the assumed direction of rotation shown by the applied arrows in FIGURE 1.

Means are provided which are active during transfer of a complete roll of tape which serve to develop a compressive force between supply roll 22 and capstan assembly 21 at the point of tape departure 25 and also between take-up roll 23 and capstan 21 at the point of arrival 30. The compressive force developed at the point of arrival is greater than at the point of departure.

The foregoing means is inherently and naturally reversible in response to a change in direction of motor 27 thereby simplifying control thereof. Thus (as schematically shown in FIGURE 1), a "bias" spring 32 is coupled to draw both the supply and take-up rolls 22, 23 equally into engagement with surfaces 31. In order to develop a greater compressive force at the point of tape arrival 30 onto take-up roll 23, friction means such as represented by devices as now to be described are employed.

A pair of pulleys 33, 34 are mounted for rotation with shaft 26. Another pair of pulleys 36, 37 are disposed upon platform 10 in fixed positions. A pair of tensioned slip bands 38, 40 (each respectively including a strand 39, 41 and spring 43 44), are trained respectively about pulleys 33, 36 and 34, 37. Both ends of each band 38, 40 are attached to an associated one of carriages 16, 18. Strand 39 is led around pulley 33 in a direction common to the direction of rotation of pulley 33 when supplying tape from roll 22 to roll 23 as shown. By reeving strand 39 in this manner about pulley 33, clockwise rotation of shaft 26 imparts a tendency to develop slight to modest slack in that reach of strand 39 extending between carriage 16 and pulley 33. Strand 41 is trained about pulley 37 and is led counterclockwise about pulley 34 whereby, during rotation of shaft 26 in a clockwise direction, that reach of strand 41 extending between pulley 34 and carriage 42 tends to develop a slight to modest additional tautness. From the foregoing it will be evident that the tendency toward slack which develops in slip band 38 and the increased tension developed in slip band 40 serves to combine with the equalized compression action of "bias" spring 32 to apply different compressive forces as between the point of tape departure 25 from supply roll 22 and the point of tape arrival 30 at take-up roll 23.

Thus, it is apparent that shaft 26 with its pulleys 33, 34 and tensioned bands 38, 40 form slip drive means which introduces a force component tending naturally and inherently to move both carriages 16, 18 in a direction opposite to the direction of tape travel and in a manner which is naturally reversed upon reversal of tape movement without further controls or apparatus. In this way the action of the slip band of the "supply" roll serves always to apply a component of force tending to urge the "supply" roll away from the capstan drum surface 31 while the action of the slip band of the "take-up" roll is always to apply a component of force tending to urge the "take-up" roll toward the drum surface 31. These forces, in conjunction with the "bias" spring 32 serves to develop suitable pressures at the points of departure 25 and arrival 30.

As shown in FIGURE 1, as capstan assembly 21 continues to rotate in a clockwise direction, tape is fed from supply roll 22 to take-up roll 23. In order to maintain continuous facial contact with drum surface 31, the traveling carriages 16, 18 and translation guide means such as rods 19, 20 accommodate changes in roll diameter.

During translation of carriages 16, 18, bands 38, 40 will advance and retreat about their respective pulleys substantially without elongating the springs 43, 44 disposed therein respectively. As one end of band 38, for example, pays out, the other end is being taken in.

Springs 43, 44 serve to retain their respective bands in position upon the pulleys with a constant tension and determine the value of the difference in compressive forces applied respectively at the points of departure and arrival. It is preferred that the springs 43, 44 have equivalent force characteristics whereby the compressive force differential is inherently reversible for bi-directional operation.

The force applied by bias spring 32 would, of course, be algebraically added to the differential forces in determining the value of the force applied at points 25, 30.

A magnetic recording transducer assembly 45 is shown positioned to dispose the transducer head 46 thereof in cooperation with the recording tape 17 as it passes around capstan assembly 21. By registering the tape edge with the surface of flange 24, transducer 46 can be laterally registered accurately with a given recording track formed along tape 17 thereby permitting recording to be accurately pursued along closely adjacent longitudinal tracks.

Transducer assembly 45 is slidably supported on ways 55, as shown in FIGURE 7, whereby head 46 can be momentarily drawn back from transducing relation with the tape by means of the knob 42.

While FIGURE 1 schematically shows a preferred embodiment wherein capstan assembly 21 engages the periphery of both supply and take-up rolls 22, 23, another embodiment is schematically shown in FIGURE 6 (wherein reference numbers each include a third order digit "6"). With reference to FIGURE 6, a pair of hubs 651, 652 form the core of supply and take-up rolls S and T respectively. A capstan 653 having a smooth peripheral drum surface which in this instance need not necessarily be resilient is further provided. Hubs 651, 652 and capstan 653 are each supported to rotate with axles journaled for rotation in fixed positions. Thus, the axles will not advance and retreat laterally during a tape transfer operation.

Means for accommodating the change in roll diameter and for applying the different compressive forces at the points of tape departure and arrival as previously mentioned are shown in FIGURE 6 by the idlers 654, 656, respectively. Each idler 654, 656 is provided with a resilient peripheral drum surface bounded by spaced flanges such as flanges 24, 28 of capstan assembly 21 previously described.

Means for suitably urging idlers 654, 656 into capstan engagement with different compressive forces, as now to be described, develops a roll of pliable recording tape formed to have the characteristics mentioned above and hereinafter.

Thus, friction means for causing idlers 654, 656 to press against the tape comprises a pair of slip bands 638, 640 each including a strand 639, 641, respectively, as well as springs 643, 644. The opposite ends of each slip band are connected to an associated one of the carriages 646, 647. Slip band 638 is trained about a pair of stationary pulleys 636, 648 and led around a pulley carried upon the capstan drive shaft 626. One of two bias springs 632 of equal resilient strength is connected at one end to carriage 647 and at the other end is anchored to the base of the apparatus.

Slip band 640 is similarly arranged including the pulleys 637, 649 and a pulley upon shaft 626. The other bias spring 632 urges carriage 646 into the V defined between the periphery of capstan 653 and of take-up roll 652.

By reference to the schematic drawing of FIGURE 9 it will be apparent that another embodiment employing swinging arms 97, 98 pivoted about points 99, 100 can be arranged to provide the foregoing roll.

As schematically shown in FIGURE 9, a supply roll 61 is rotated clockwise by peripheral engagement with a counterclockwise rotating capstan 62. The take-up roll 63 also rotates clockwise by peripheral engagement with capstan 62. Each of rolls 61, 63 is free to move between advanced and retracted positions to advance and retreat with respect to the axis of capstan 62. A slip band 64 is trained about a stationary pulley 65 and passes around a pulley fixed on the shaft of capstan 62. Another slip band 66 is similarly trained about a pulley 67 and about the shaft of capstan 62. The opposite ends of each band 64, 66 are attached to a carriage 97, 98 respectively which moves with the approaching and retracting movement of the support spindles 59, 60 of rolls 61, 63 respectively. A bias spring 70 comparable to spring 32 of FIGURE 1, is provided.

It will be observed that for the direction of rotation shown, reach 71 of band 64 will receive a force component acting to introduce a tendency toward slack while reach 72 is subjected to a modest increase in its tension.

According to another embodiment, as shown in FIGURE 11, the means for applying a differential of compressive forces across the drive capstan 21 (of the embodiment in FIGURE 1) can be advantageously accomplished with but a single length of cord and the bias spring 32.

Thus, a slip band 47, including a tension spring 48, is secured at one end 49 to carriage 16. Band 47 is then led around pulley 33 in a direction opposite to the illustrated direction of the driving thereof and carried around pulleys 36, 37 to return to shaft 26 where it is wrapped about pulley 34 in a direction opposite to the illustrated rotation of shaft 26. Band 47 then leads to carriage 18 where the other end 50 is secured. Spring 48 is preferably disposed most conveniently in that bight of band 47 lying between pulleys 33, 34.

Apparatus as herein described has been constructed and operated satisfactorily. In one example, spring 32 served to apply a force of sixty ounces at the points of departure 25 and arrival 30 of the tape, measured while capstan 21 was at rest. With an arrangement as shown in FIGURE 9, rotation of the capstan developed eighty ounces of force at the point of arrival of tape onto the take-up roll while a force of fifty ounces was developed at the point of departure of the tape from the supply roll. The diameter of the supply roll was initially eight inches using a quarter inch wide conventional magnetic recording tape, and an aluminum hub of four and a half inches diameter.

By increasing the tension in one or the other of springs 43, 44 the differential in applied compressive forces can be varied by varying the frictional forces developed at the pulleys on the capstan shaft 26.

Apparatus according to the foregoing construction not only provides the unexpectedly highly compacted and self-sealed roll of tape wherein the edges of the tape convolutions are precisely aligned to form a smooth side surface to the roll, having a surface roughness on the order of 40–60 microinches R.M.S. but also serves to permit tape to be fed at phenominal rates.

For example, a construction according to FIGURE 1 can feed a ten inch diameter roll of tape having a width of one quarter inch at a rate on the order of 1,500 inches (125 feet) per second. When feeding tape at such speeds it is possible to eliminate, for example, in a video tape recorder application, the well known rotating transducers and all of their associated drive and control elements and devices.

The platter-like nature of the tightly packed tape permits acceleration and deceleration on the order of 2000 inches per second per second to be employed without causing any convolution to become "cinched," and therefore, extremely brief start and stop periods can be used even though tape speed may exceed 1500 inches per second, as employed in longitudinal recording of T.V. or video frequencies. In longitudinally recording at such speeds, with the foregoing transport, the tape is fully controlled from supply roll to capstan and from capstan to takeup roll whereby the capstan drives both rolls at substantially identical peripheral speeds without transmitting driving forces longitudinally of the tape. In this manner the transport overcomes or avoids virtually all of the prior problems of servo-controlling the capstan drive and both reel drives in order to maintain a proper tension level in the tape.

It has been observed that in conventional tape rolls the tension profile, i.e., the curve of tension in each convolution plotted against the radial displacement thereof, has a definite slope and may pass through zero tension and, for certain inner convolutions, causes the tape to be compressed lengthwise somewhat. When subjected to high torque driving conditions, the roll of tape will develop a "cinched" convolution of tape, usually at that convolution lying between regions of positive and negative tension, i.e., at the radial displacement representing the transition from convolutions under tension and those under longitudinal compression.

Thus, as shown in FIGURE 15 a roll of conventional tape 101 is represented as wrapped upon a hub 102. During the wrapping procedure a constant drag force, F*k*, acts in the direction of arrow 103 to produce a constant longitudinal tension, T*k* in tape 101 as represented by arrow 104. The roll of tape is driven as shown by arrow 106. As tension of each rolled convolution is plotted on orthogonal coordinates X, Y, a curve or trace 107 is formed whereby tension in the outermost convolution equals T*k* but, for those convolutions progressively inwardly of the outermost, the tension diminishes until, at convolution 108, the tape is no longer under tension. Convolutions disposed further radially inwardly become subjected to longitudinal compression, as indicated by those in zone 109.

If a quick clockwise acceleration is applied to the hub of such a roll, the transition convolution 108 will become "cinched" or buckled. This has been explained by the fact that torque developed by drag force, F*k* multiplied by the radius of the roll exceeds the frictional force of engagement of a convolution of lesser radius times the applied torque of the drive shaft or hub 102. The frictional force of engagement is produced by the coefficient of friction times the radially compacting forces due to tension in the outer convolutions.

It has further been observed in a typical example where hub diameter was on the order of one-third roll diameter, that the roll produced by the method and apparatus described above develops a tension profile having little to no slope whereby tension remains substantially constant throughout convolutions disposed along a major radial extent of the roll. Thus, as in FIGURE 16 a tape 211 is wrapped upon hub 212 according to the procedures disclosed herein. A capstan 213 feeds tape 211 onto the roll in the direction 214. When tension Y is calculated and plotted against radial displacement X of the convolutions of tape the curve 216, having a very low or zero slope, is produced. The dotted line portion of curve 216 represents a certain degree of relaxation of the tape with time after forming the roll.

An 8-inch tape roll characterized by such a tension profile, when subjected to the high acceleration forces noted above, successfully resists cinching and performs virtually with the dynamic characteristics of a platter.

A roll of tape, prepared to have the above tension profile, exhibits extraordinary self-supporting strength in its own plane. For example, in one test as in FIGURES 17 and 18, a ten-inch roll of quarter inch conventional recording tape wrapped up on a 4.5 inch hub was subjected to various loads while supported upon fixed bars 217, extending across chords at the edge of the roll where the chords had an altitude of a quarter inch. Deflection of the hub was measured as by a gage 218 operated by a feeler 219. As shown in curve 221 (FIGURE 18) for such a roll wrapped in accordance with the above teaching a load on the order of twelve pounds was required to deflect the hub 0.015 inch before introducing a permanent deflection of 0.001 inch.

A similarly dimensioned conventional roll of tape as considered heretofore as being of extremely good self-supporting characteristics was similarly tested to provide the curve 222. From inspection of curves 221, 222 it will be readily evident that the same permanent deflection (of 0.001 inch) is encountered in the conventional roll much earlier and with much less load.

It was also observed, using apparatus of the kind described that a given recorded bit of data applied to tape 17 could be readily and accurately repositioned repeatedly into cooperative relation with the transducer 46 due to gentle handling of the tape which introduces no permanent deformation. For example, as a test using a straight edge, a radial line can be marked across the edges of the convolutions of the supply roll and thereafter, notwithstanding repeated transfers of the tape from supply roll 22 to take-up roll 23 and return, the radial line is repeatedly reformed on the supply roll substantially without deviation. Thus, highly repeatable performance in handling the tape is assured whereby longitudinal and lateral head positioning is dependable.

While the foregoing discussion respecting the cinching of a convolution of tape has been directed primarily to cinched convolutions developed while the roll is being accelerated at a high rate, it has been observed that conventional rolls of tape can develop a cinched convolution even while in storage. A roll of tape prepared according with the present invention, however, further serves to overcomes such development under storage conditions as well as under the dynamic conditions noted above.

Operation of the device in feeding the roll of tape is as follows: A supply roll 22 of tape is mounted upon spindle 12 and the periphery of roll 22 disposed between flanges 24, 28 whereby the edges of the outermost plurality of convolutions of supply roll 22 are engaged by the confronting surfaces of flanges 24, 28. The face of tape 17 is pressed into facial engagement with the resilient surface 31 of capstan assembly 21. Tape 17 is led around capstan 21 past transducer 46, and an initial convolution or two are applied about hub 15 to initiate take-up roll 23. Thereafter motor 27 is engaged to drive capstan 21 clockwise (FIGURE 1).

Capstan 21 drives each of rolls 22, 23 by peripheral driving engagement whereby tape passing through the zone defined between the point of departure of tape from supply roll 22 and the point of arrival of tape onto take-up roll 23 is subjected to no undue longitudinal tensioning even during high acceleration on the order of over one thousand inches per second per second notwithstanding the extremely high speed achieved. Tape in the foregoing zone is supported in facial engagement throughout its width and entire length for the complete tape transfer operation. At no point is the tape an open filament wherein it would be unsupported.

After the tape has been fed to take-up roll 23, the tape can be rethreaded back onto hub 13 and the procedure reversed by reversing the drive of shaft 26. During the return operation it will be noted that applied compressive force at the point of arrival of tape onto roll 22 from roll 23 will be automatically greater than at the point of departure of the tape from roll 23. Proper tensioning of bands 38, 40 is reversed inherently.

It should also be noted that regardless of acceleration or velocity of shaft 26 the difference in applied compressive forces remains constant. Thus, the roll will obtain its characteristic stiffness at both high and low tape speeds, making such rolls and apparatus suitable for longitudinal recording at high and low tape speeds.

From the foregoing, it will be readily apparent that by pursuing the following steps a significantly improved roll of tape, highly compacted, and sealed against attack by dirt, grit, etc. can be formed without detriment to the tape or to its utilization in precision data and signal recording applications.

The method entails the steps of drawing the tape from a supply roll while, at the point of departure of tape from the supply roll, placing the tape in facial engagement with a resilient annular surface. The annular surface is moved continuously substantially with the tape at the point of departure while at the same time the supply roll and the annular surface are urged together with a predetermined force. The tape is further attached to a hub so as to define a reach of tape extending from the point of departure to the hub. The reach of tape so defined is then maintained in continuous facial engagement with annular surface portions throughout the entire longitudinal extent of the defined reach for the period of a substantially complete transfer of the roll of tape onto the hub.

In the preferred apparatus above, the aforementioned annular surface "portions" are all provided by the drive capstan periphery 31 whereas in other apparatus, such as shown in FIGURE 6, the annular surface "portions" may be derived from several rotating cylindrical bodies.

In further pursuing the method, later steps include drawing the tape from a resilient one of the annular surface portions onto the take-up roll at the point of arrival of the tape while, at the point of arrival, moving the last named annular surface portion and the periphery of the take-up roll continuously in a common direction while urging them together at that point with a predetermined force which is greater than the predetermined force that served to urge the supply roll into engagement with its cooperating annular surface.

For a preferred formation of the roll, the following added step of urging an edge of at least the outermost pair of tape convolutions against a smooth guide surface (such as flange 24 or a fixed guide surface) at both the points of departure and arrival provides a smooth side face to the roll whereby the margin of the recording surface of the tape convolutions will not be exposed whatsoever. In this manner a side surface "finish" having a roughness on the order of 40–60 microinches R.M.S. is obtained.

The foregoing described apparatus cooperates to provide the improvement of automatic threading of the leading portion of a tape from the supply roll onto the take-up hub as now to be described.

This improvement comprises generally, as will be further developed in particular detail below, adhesion means on the leading portion of the tape. The adhesion means is interposed to normally retain the outermost convolution of the roll to the next adjacent convolution. Means for releasing the grip of the adhesion means when it is led away from the supply roll have been provided as well as means for engaging the leading portion and directing it throughout the length of that zone of tape movement extending between the supply and take-up rolls.

In a preferred construction the last named means is provided by flanges carried on the drive capstan. In another embodiment a protective guiding surface spaced from and conforming to the capstan periphery supplies the foregoing function.

The general arrangement of the automatic threading construction takes advantage of the fact that the tape path, as formed by the tape transport mechanism described above, serves to dispose the adhesion means in a confronting, adhering engagement with the take-up hub at the point of arrival. Thus, the path of the tape via the zone of movement which extends from the point of departure to the point of arrival orients the adhesion means into a confronting relation with the hub. Thus, the capstan itself, being urged against the take-up hub by the forces mentioned above, provides means for pressing the tape into adhering relation therewith.

The roll of tape, as shown in FIGURE 2, includes a leader portion 77. Adhesion means such as a strip 76 of pressure sensitive adhesive is interposed to retain the outermost convolution of the roll to the next adjacent convolution on the supply roll. Strip 76 is narrower than the leader portion to leave anti-friction margins 81. The outer terminal portion of leader portion 77 is characterized by a non-adhering tab portion 83 free to extend naturally from the supply roll. The flanges 24, 28 on the capstan resiliently engage the edges of tab portion 83 and draw it throughout that zone of tape movement extending between the supply and take-up rolls.

As mentioned, the capstan is disposed to define a path of tape movement whereby the adhesion means will confront the take-up hub at the point of arrival thereat. Thus the capstan can press the adhesion means into engagement with the take-up hub and attach it thereto.

Means are further provided which serve to release the grip of the adhesive strip 76 from engagement with the second outermost convolution of the supply roll.

More particularly, as shown in FIGURES 7 and 8, a channeled block member 84 is disposed in closely spaced relation to the periphery of the capstan to define a channel 88. At the ends of channel 88, block member 84 is formed to provide pairs of laterally spaced peeling edges 86 which initiate wedging surfaces for picking up the naturally extending, unadhered, tab portion 83. Edges 86 are closely spaced from the periphery of the supply roll.

In a typical threading operation, as supply roll 22 is rotated to feed tape to the take-up hub 15, the edges of tab portion 83 will be pressed into engagement with the flanges 24, 28 of capstan assembly 21. The face of the tab and the following tape will also be pressed against the resilient periphery 31. Therefore, there will be firm engagement of the leader portion of tape with the capstan acting to draw the tape around capstan assembly 21. The grip of the adhesive is overcome by the peeling and wedging action of edges 86 as they make slidable engagement with the anti-friction margins 81 of the leader portion.

While not entirely necessary in all instances, it is preferred to provide protective guide means spaced from the periphery of the capstan such as defines channel 88 therebetween. Channel 88 extends substantially from the point of departure of the tape from the supply roll to the point of tape arrival at the take-up hub.

In general, the protective guide can be considered as a single defining surface which includes a relieved zone extending along the channel. The relieved zone is exposed to confront the path of adhesive strip 76 and accommodate its passage along the channel. Thus, at no point is adhesive strip 76 exposed for accidental contact and, should engagement of the tape by the capstan be lost momentarily the guide 87 provides insurance for proper feeding thereof.

Prior to threading, transducer assembly 45 is drawn out of recording relation to periphery 31 by means of knob 42 and slide ways 55.

As shown in FIGURE 8 of the drawing channel block 84 is formed with a groove 89 between guide surfaces 87. Groove 89, accordingly, confronts the path of adhesive strip 76 and is exposed thereto during its travel from supply to take-up roll 23.

After tape of the type described has been utilized over a continuing period the adhesive strength of strip 76 may diminish to a limited extent by adherence of dirt, dust or the like, whereby adhesion of the leader portion onto take-up hub 15 is diminished to a point where the grip of flanges 24, 28 would not be overpowered by the adhesive at the point of arrival 30.

Therefore, in order to further insure that proper tape transfer is effected onto the take-up hub, a peeling edge 86 and wedging surface 87 is disposed substantially at the point of arrival 30 of tab portion 83 at the take-up hub and downstream of point 30.

The wedging surface 87 engages that face of tab portion 83 which is adjacent the resilient periphery 31 and thereby serves to direct the leader portion toward the take-up hub 15 so as to positively disengage tape from the capstan.

In FIGURE 7 a wedge portion 91 of a protective block member 92 is formed to include a pair of peeling edges comparable to the peeling edges 86 shown in FIGURE 8. The peeling edges of wedge portion 91 are closely spaced adjacent the resilient periphery 31 of the capstan so as to engage that face of the leader portion of tape which is adjacent periphery 31 as it arrives at hub 15.

According to another construction (FIGURE 10) of a leader portion 73, a leader is formed from a separate piece of material for ease in its manufacture and attachment to an information record tape 74. In this embodiment the material of the leader is stiffer so as to provide a modest increase in resistance to bending about an axis extending along its length. Therefore, when pressed into facial engagement with resilient surface 31, the flanges 24, 28 of the capstan provide enhanced engagement along its edges. The remainder of the roll comprises an information record portion 74 of tape with the exception of the innermost end of the roll. The innermost end of the roll similarly employs a portion 73 adapted to serve as leader when tape is returned from the take-up hub 15 back to the supply hub 13. Thus, the adhesive strips 82′ are disposed on a common face of the tape ends.

According to the embodiment in FIGURE 10 and to further insure adequate engagement of tab portion 75 by flanges 24, 28 the tab portion 75 is widened.

A preferred degree of widening of tab portion 75 has been found to lie within a range of 2 to 5 mils greater than the width of the record portion of the tape, whereby the tab portion will be slightly wider than the next adjacent convolution of the tape roll.

Appropriate stiffness to the leader portion is imparted by conventional Mylar or acetate base material of a thickness on the order of 3 to 5 mils.

As shown in the embodiment of FIGURES 5A and 5B, it will be noted that the leader portion shown is fabricated to include a surface layer of pressure sensitive adhesive material 78 coextensive with the width of a recording tape 79.

Anti-friction marginal surfaces 81 are then formed along the applied layer 78 by applying a suitable smooth drying shellac or plastic material. Application of the smooth drying material to the leader portion may be done in any suitable way such as by employing masking devices in protective relation to the adhesive strip 82. In the foregoing manner an adhesive strip is laid down on a leader portion of the tape without substantially increasing the thickness midway between the edges. Accordingly, the innermost convolution of tape will wrap in a particularly desired manner about take-up hub 15.

The construction of the last named leader embodiment has been employed to some extent in that of FIGURE 10. Thus, the anti-friction margins in FIGURE 10 and its adhesive strip are designated respectively 81′ and 82′ as has the layer 79′. In FIGURE 10, however, a base layer 80 underlies portion 75.

After a transfer of tape 17 from supply roll 22 to take-up roll 23 it will be readily apparent that on the take-up hub 15 there is provided a recording tape roll of pliable tape including an information record portion and an inner terminal portion which served as the leader. Preferably the terminal portion is of uniform thickness throughout its width and coextensive with the circumference of the hub, with adhesive means interposed between the inner terminal portion and the hub whereby the adhesive serves in attaching the end of the tape thereto.

As previously noted the outermost end of tape on the take-up roll includes a similar leader whereby the tightly packed roll of tape is not only secured against unraveling but is formed into a sealed roll fully protected against the deleterious effects of dirt, grit and moisture acting upon the recording surface.

Thus, a significantly improved tape transport apparatus has been provided. The apparatus disclosed serves to produce a roll of magnetic recording tape having substantial rigidity in the plane thereof and a characteristic constant tension profile.

Having in mind the foregoing description of the schematic arrangements shown in the above mentioned drawings, there is provided a detailed construction as shown in FIGURES 12 through 14 as now to be described.

A base plate or platform 111 supplies a supporting framework for the transport apparatus as well as providing a housing for associated electronics and control circuitry for the operation thereof. A drive capstan 112 includes flanges 113, 114 one of which is resiliently urged by a suitable diaphragm spring (not shown) toward the other, the latter being fixed to capstan 112. Preferably the bottom flange is fixed and the top flange movable. Capstan 112 is formed with a resilient drum surface and is mounted for rotation upon its shaft 116. Shaft 116 is driven by a suitable motor carried within a base block 117.

Satellite carriage assemblies 118, 119 are supported for movement between edvanced and retracted positions with respect to the periphery of capstan 112 and are supported upon ways consisting of pairs of rods 121, 122 supported from base block 117 and clamped thereto by means of a screw 123 adapted to compress a slotted sleeve portion 124 of base block 117.

Inasmuch as carriages 118, 119 are identical, only carriage 118 will be described hereinafter.

Carriage 118 includes a journal body 126 serving to support an axle 127 for rotation therein. At the outer end of axle 127, means (not shown) have been provided to cooperate with a hold down knob 128 adapted to be screwed down tightly thereagainst whereby a resilient O-ring 129 can be compressed into engagement between knob 128 and the hub 131 of a supply roll of tape 132.

Carriage assembly 118 further includes a skirt portion 133 formed to extend outwardly from journal body 126. Skirt portion 133 is formed integrally, as in casting, for example, with journal body 126 and includes an upwardly etxending tab portion 134 which serves to carry a roller 136 adapted to ride along the upper surface of rod 122.

Another roller 137 is carried in opposed relation to roll along the underside of rod 122 and is spring loaded by means of a leaf spring 138. Spring 138 is connected at its rear end to the underside of journal body 126 and at its near end (as viewed in FIGURE 13) to a roller support block 139 which carries roller 137. Thus, roller 137 bears resiliently against the underside of rod 122.

Thus, the forward end of carriage assembly 118 is arranged to slidably roll along rod 122. The rear of carriage assembly 118 is slidably supported to move along rod 121 by means of a ball bushing 141. Bushing 141 is carried within a slotted portion of the assembly whereby upstanding ears 142 arranged in opposed relation can be drawn together by means of threaded studs 143.

An elongated helical bias spring 144 is anchored at its opposite ends by means of screws 146 whereby carriages 118, 119 are drawn with equal force toward the resilient periphery of capstan 112. The compressive force acting upon capstan 112 at the point of tape arrival thereupon and point of tape departure therefrom as applied by bias spring 144 is varied or modulated by means, now to be described, for introducing a component of force at such points whereby the component of force acts at both points in a direction opposite to the direction of carriage movement of both carriages 118, 119.

Accordingly, a first slip band 147 includes strand 148 and spring 149. One end of slip band 147 is fastened to one of the ears 142 of carriage assembly 118 and then trained about a pulley 151 supported for rotation at the upper end of a post 152 clamped in fixed position to the end of rod 121. Slip band 147 then leads around shaft 116 in a direction opposite to the direction of rotation thereof when driving capstan 112 in a direction which feeds tape from the supply roll formed upon hub 131. Slip band 147 then leads back to carriage assembly 118 and is anchored by means of a screw 153 at the side of journal body 126.

Similarly a second slip band 157 comprised of a strand 158 and a spring 159 is trained about pulley 161 mounted upon post 162 and secured by a screw 163 to the side of the journal body of assembly 119.

A magnetic recording transducer 164 is supported to cooperate with tape being transferred from the supply roll to the take-up roll. Transducer 164 is arranged whereby it can be moved laterally of the direction of movement of tape 132 as tape 132 is carried around capstan 112. Transducer 164 is also arranged to be selectively withdrawn out of engagement with the peripheral surface of capstan 112.

Thus, a transducer support assembly as now to be described is supported for movement upon spaced parallel rods 167, 168 extending vertically upwardly from, and secured in, base block 117. A ball bushing 169 is carried within a sleeve portion 171 whereby the carriage portion 172 of assembly 166 is slidably movable along rod 167. A spring 173 serves to urge carriage portion 172 downwardly whereby a head positioning cam 174, in the form, for example, of an eccentric, cooperates with a cam follower portion (not shown) located beneath cam 174. Cam 174 is carried upon an axle journaled in base block 117 whereby the axle of cam 174 remains fixed as the transducer support assembly 166 is moved upwardly and downwardly upon rotation of cam 174.

Means are provided for rotating cam 174 which include a track selection knob 176 having a stem 177 journaled in a bushing 178 carried on a protective front plate 179. A pinion 181 rotates with rotation of knob 176 to drive a gear 182 of relatively large diameter carried upon the axle 183 which supports cam 174. Accordingly, the rotary movement of knob 176 is considerably reduced by the foregoing gear reduction means whereby transducer 164 is moved only slightly for large increments of rotational displacement of knob 176 whereby any one of a number of given track positions on tape 132 can be selected for playing or recording.

As explained above, transducer support assembly 166 is arranged to slide along one rod 167 by means of the ball bushing 169. Assembly 166 also slides along the other rod 168 by means of a pair of opposed rollers 184, 186. One roller, 186, is supported upon a fixed post secured to carriage portion 172. The other roller, 184, is resiliently urged toward roller 186 whereby roller 184 yieldingly bears against rod 168 by means of a leaf spring support (not shown) extending between carriage portion 172 and a roller support block 187.

Transducer 164 is embodied in a transducer sub-assembly 188 disposed in appropriate registration by means of reference pins 189 carried by carriage portion 172.

Means are provided whereby transducer 164 can be selectively withdrawn out of engagement with the resilient drum periphery of capstan 112 as desired. Thus, a knob 191 is connected by a stem 192 to rotate a cam 193 whereby a cam follower 194, connected to transducer carriage portion 172, is moved clockwise about the axis of rod 167 against the resilient urging of roller 184 bearing against rod 168.

Operation of the apparatus shown in FIGURES 12 through 14 is as follows:

A roll of tape 132 is secured to rotate with axle 127 by means of a hold down knob 128. A leading portion of tape 132 is pressed between and drawn by edgewise engagement between flanges 113, 114 whereby the leading portion of the tape is carried around capstan 112 past transducer 164 then in its withdrawn position, as effected by appropriate rotation of knob 191. The leading portion of tape 132 continues around capstan 112 until it is pressed against the periphery of the take-up hub.

Using a roll of tape as described earlier above wherein a strip of adhesive is exposed and adapted to be pressed against the take-up hub so as to withdraw the tape from the capstan it will be apparent that the tape will adhere to the hub and the take-up hub then commences to increase in diameter during continued operation of the transport. As the take-up hub increases in diameter, the supply roll decreases in diameter and accordingly take-up carriage 119 will proceed away from capstan 112 as supply carriage 118 proceeds toward capstan 112. Meanwhile, throughout transfer of the complete roll of tape, a greater compressive force is applied at the point of tape departure from capstan 112 than is applied at the point of tape arrival thereto. This is accomplished by means of the slip bands 147, 157 acting in conjunction with the bias spring 144.

A transport construction according to the embodiment shown in FIGURES 12 through 14 has been constructed and provides a roll of tape having a tension profile characteristic corresponding to that of the roll previously described.

What is claimed is:

1. In a tape transport of the type adapted to support a length of pliable recording tape wrapped to form supply and take-up rolls, means for rotatably supporting each of said rolls, drive means adapted to support and feed tape from such supply rolls to the take-up roll, said drive means comprising annular rotating means having resilient arcuate surface portions disposed to be adapted to contact and rotate the supply and take-up rolls, the points of contact with said supply and take-up rolls respectively being the points of tape departure therefrom and arrival thereto when feeding tape from the supply to the take-up roll, means active during transfer of tape from the supply to the take-up roll for developing a compressive force between the supply roll and the cooperating arcuate surface portion at said point of departure and between the take-up roll and the cooperating arcuate surface portion at said point of arrival, the compressive force being greater at said point of arrival, and guide means at said points of departure and arrival, said guide means providing at both said point of departure and said point of arrival registration surfaces engaging the opposite edges of tape thereat.

2. In a tape transport of the type adapted to support a length of pliable recording tape wrapped to form supply and take-up rolls, means for rotatably supporting each of said rolls, drive means adapted to support and feed tape from such supply roll to the take-up roll, said drive means comprising means providing at least one arcuate resilient surface portion disposed and adapted for cooperative engagement with the periphery of the supply roll at the point of departure of the tape therefrom and providing another arcuate resilient surface portion disposed and adapted for cooperative engagement with the periphery of the take-up roll at the point of arrival of the tape thereto, said drive means providing surface portions having continuous contact with the tape throughout that zone of tape movement extending from said point of departure to said point of arrival, and means active during transfer of tape through said zone for developing a compressive force between the supply roll and the cooperating arcuate surface portion at said point of departure and between the take-up roll and the cooperating arcuate surface portion at said point of arrival, the compressive force being greater at said point of arrival.

3. Tape transport apparatus according to claim 2 wherein said arcuate surfaces are both formed as parts of a single annular surface.

4. In a tape transport of the type adapted to support a length of pliable recording tape wrapped to form supply and take-up rolls, means for rotatably supporting each of said rolls, drive means adapted to support and feed tape from such supply roll to the take-up roll, said drive means comprising means providing at least one arcuate resilient surface portion disposed and adapted for cooperative engagement with the periphery of the supply roll at the point of departure of the tape therefrom and providing another arcuate resilient surface portion disposed and adapted for cooperative engagement with the periphery of the take-up roll at the point of arrival of the tape thereto, at said point of departure the tape being disposed to transfer onto the cooperating arcuate surface portion thereat, and at said point of arrival the tape being disposed to transfer from the second named arcuate surface portion to the take-up roll, guide means at said points, said guide means providing at both said point of departure and said point of arrival a registration surface, said registration surface serving to engage and register in a predetermined plane an edge of the outermost plurality of adjacent convolutions of tape during transfer at said points, and a second registration surface opposing the first and serving to engage the other edge of the tape at said points and resiliently urge the tape against the first registration surface, said drive means providing surface portions having continuous contact with the tape throughout that zone of tape movement extending from said point of departure to said point of arrival, and means active during transfer of tape through said zone for developing a compressive force between the supply roll and the cooperating arcuate surface portion at said point of departure and between the take-up roll and the cooperating arcuate surface portion at said point of arrival, the compressive force being greater at said point of arrival.

5. In a tape transport of the type adapted to support a length of pliable recording tape wrapped to form supply and take-up rolls, means for rotatably supporting each of said rolls for rotation, drive means adapted to support and feed tape from such supply roll to the take-up roll, said drive means comprising a capstan having a resilient peripheral surface disposed and adapted for cooperative engagement with the periphery of the supply and take-up rolls at the point of departure of the tape therefrom and at the point of arrival of the tape thereto respectively, the resilient capstan surface having continuous contact with the tape throughout that zone of tape movement extending from said point of departure to said point of arrival, and means active during transfer of tape through said zone for developing a compressive force between the supply roll and capstan at said point of departure and between the take-up roll and capstan at said point of arrival, the compressive force being greater at said point of arrival.

6. In a tape transport of the type adapted to support a length of pliable recording tape wrapped to form supply and take-up rolls, means for rotatably supporting each of said rolls for rotation, drive means adapted to support and feed tape from such supply roll to the take-up roll, said drive means comprising a capstan having a resilient peripheral surface disposed and adapted for cooperative engagement with the periphery of the supply and take-up rolls at the point of departure of the tape therefrom and at the point of arrival of the tape thereto respectively, and means active during transfer of tape through said zone for developing a compressive force between the supply roll and capstan at said point of departure and between the take-up roll and capstan at said point of arrival, the compressive force being greater at said point of arrival.

7. In a tape transport of the type adapted to support a length of pliable recording tape wrapped to form supply and take-up rolls, means for rotatably supporting each of said rolls for rotation, drive means adapted to support and feed tape from such supply roll to the take-up roll, said drive means comprising a capstan having a resilient peripheral surface disposed and adapted for cooperative engagement with the periphery of the supply and take-up rolls at the point of departure of the tape therefrom and at the point of arrival of the tape thereto respectively, the resilient capstan surface having continuous contact with the tape throughout that zone of tape movement extending from said point of departure to said point of arrival, guide means providing a registration surface at said points of departure and arrival to engage and register in a predetermined plane an edge of the outermost plurality of adjacent convolutions of tape during transfer at said points and a second registration surface opposing the first and serving to engage the other edge of the tape at said points.

8. In a tape transport of the type adapted to support a length of pliable recording tape wrapped to form supply and take-up rolls, means for rotatably supporting each of said rolls, a drive capstan, motive means for driving said capstan, means for reversing the rotational movement of said capstan to feed tape in opposite directions and thereby constitute the supply roll as the take-up roll, and vice-versa, a resilient peripheral surface around the capstan, means urging said supply and take-up rolls simultaneously into contacting relation with the resilient periphery of the capstan, the last said means being continuously active throughout a substantially complete transfer of the tape to develop a greater compressive force at the point of contact between the take-up roll and a capstan surface than between the supply roll and capstan surface, said last means being naturally responsive to reversal of the rotational movement of the capstan to reverse the forces developed and thereby develop a greater compressive force at the point of contact between the newly constituted take-up roll and capstan surface than between the newly constituted supply roll and capstan surface.

9. Tape transport apparatus according to claim 8 wherein said last means includes friction means serving to introduce a component of force tending naturally and inherently to move the axes of both rolls in a direction opposite to the direction of tape travel and which naturally reverses upon reversal of rotation of said capstan.

10. In a tape transport of the type adapted to support a length of pliable recording tape wrapped to form supply and take-up rolls, means for rotatably supporting each of said rolls for rotation, drive means adapted to support and feed tape from such supply roll to the take-up roll, said drive means comprising a capstan having a resilient peripheral surface disposed and adapted for cooperative engagement with the periphery of the supply and take-up rolls at the point of departure of the tape therefrom and at the point of arrival of the tape thereto respectively, at said point of departure the tape being disposed to transfer onto the capstan thereat, and at said point of arrival the tape being disposed to transfer from the capstan to the take-up roll, guide means at said points, said guide means providing at both said point of departure and said point of arrival a registration surface, said registration surface serving to register in a predetermined plane an edge of the outermost plurality of adjacent convolutions of tape during transfer at said points and a second registration surface opposing the first and serving to engage the other edge of the tape at said points and yieldingly direct the tape against the first registration surface, and a transducer disposed between said points in cooperative transducing relation with respect to a longitudinal track of said tape.

11. Tape transport apparatus according to claim 10 wherein said guide means includes opposed flanges carried by said capstan to rotate therewith, each protruding radially beyond the resilient capstan surface to overlie the outermost convolutions of both said supply and take-up rolls.

12. In a tape transport of the type adapted to support a length of pliable recording tape wrapped to form supply and take-up rolls, means for rotatably supporting each of said rolls, a drive capstan, a resilient peripheral surface around the capstan, means urging said supply and take-up rolls simultaneously into contacting relation with the resilient periphery of the capstan, said tape being at all times in engagement with the capstan throughout that length of tape extending from the supply roll to the take-up roll, the last said means being continuously active throughout a substantially complete transfer of the tape to develop a greater compressive force at the point of contact between the take-up roll and capstan surface than between the supply roll and capstan surface.

13. In a tape transport of the type adapted to support a length of pliable recording tape wrapped to form supply and take-up rolls, means for rotatably supporting each of said rolls for rotation, drive means adapted to support and feed tape from such supply roll to the take-up roll, said drive means comprising a capstan having a resilient peripheral surface disposed and adapted for cooperative engagement with the periphery of the supply and take-up rolls at the point of departure of the tape therefrom and at the point of arrival of the tape thereto respectively, the resilient capstan surface having continuous contact with the tape throughout that zone of tape movement extending from said point of departure to said point of arrival, means active during transfer of tape through said zone for developing a compressive force between the supply roll and capstan at said point of departure and between the take-up roll and capstan at said point of arrival, the compressive force being greater at said point of arrival, a transducer disposed in cooperative relation with the tape to transduce a record track extending along the tape, said transducer cooperating with the tape at a point in the travel thereof where the tape engages the resilient capstan surface, means serving to laterally register a record track of the tape with respect to the transducer, the last named means comprising means forming a registration surface moving with the tape to engage and register one edge of the tape in a predetermined reference plane to relate said track laterally with respect to the transducer.

14. In a tape transport of the type adapted to support a length of pliable recording tape wrapped to form supply and take-up rolls, means for rotatably supporting each of said rolls for rotation, drive means adapted to support and feed tape from such supply roll to the take-up roll, said drive means comprising a capstan having a resilient peripheral surface disposed and adapted for cooperative engagement with the periphery of the supply and take-up rolls at the point of departure of the tape therefrom and at the point of arrival of the tape thereto respectively, the resilient capstan surface having continuous contact with the tape throughout that zone of tape movement extending from said point of departure to said point of arrival, means active during transfer of tape through said zone for developing a compressive force between the supply roll and capstan at said point of departure and between the take-up roll and capstan at said point of arrival, the compressive force being greater at said point of arrival, a transducer disposed in cooperative relation with the tape to transduce a record track extending along the tape, said transducer cooperating with the tape at a point in the travel thereof where the tape engages the resilient capstan surface, means serving to laterally register a record track of the tape with respect to the transducer, the last named means comprising means forming registration surfaces moving with the tape to engage opposite edges of the tape therebetween at said points of departure and arrival so as to register one edge of the tape in a predetermined plane and dispose said track laterally in registration with respect to said transducer.

15. In a tape transport of the type adapted to support a length of pliable recording tape wrapped to form supply and take-up rolls, means for rotatably supporting each of said rolls for rotation, drive means adapted to support and feed tape from such supply roll to the take-up roll, said drive means comprising a capstan having a resilient peripheral surface disposed and adapted for cooperative engagement with the periphery of the supply and take-up rolls at the point of departure of the tape therefrom and at the point of arrival of the tape thereto respectively, the resilient capstan surface having continuous contact with the tape throughout that zone of tape movement extending from said point of departure to said point of arrival, means active during transfer of tape through said zone for developing a compressive force between the supply roll and capstan at said point of departure and between the take-up roll and capstan at said point of arrival, the compressive force being greater at said point of arrival, a transducer disposed in cooperative relation with the tape to transduce a record track extending along the tape, said transducer cooperating with the tape at a point in the travel thereof where the tape engages the resilient capstan surface, means serving to laterally register a record track of the tape with respect to the transducer, the last named means comprising means forming a first registration surface extending radially of the resilient capstan surface, means forming a second registration surface extending radially of the resilient capstan surface and opposing the first registration surface in spaced relation thereto to receive the tape therebetween, said first registration surface serving to register one edge of the tape in a predetermined plane to relate said track laterally with respect to the transducer, and means resiliently urging said second registration surface against the other edge of the tape to maintain the track in registration with respect to the ransducer.

16. In a tape transport of the type adapted to support a length of pliable tape wrapped upon hubs to form supply and take-up rolls, and having cyclically moving drive means disposed between the rolls, the improvement for automatically threading and directing a leader portion of the tape from the supply roll onto the take-up hub comprising adhesion means on the leader portion of the tape and interposed to normally retain the outermost convolution of the roll to the next adjacent convolution, means for releasing the grip of said adhesion means in feeding the leader portion away from the supply roll, means engaging said leader portion and directing same throughout that zone of tape movement extending between the supply and take-up rolls, and means disposing said adhesion means in adhering engagement with said hub.

17. In a tape transport of the type adapted to support a length of pliable tape wrapped upon hubs to form supply and take-up rolls, and having a drive capstan disposed between the rolls, the improvement for automatically threading and directing a leader portion of the tape from the supply roll onto the take-up hub comprising adhesion means on the leader portion of the tape and interposed to normally retain the outermost convolution of the roll to the next adjacent convolution, means for releasing the grip of said adhesion means in feeding the leader portion away from the supply roll, means engaging said leader portion and carrying same therewith throughout that zone of tape movement extending between the supply and take-up rolls, and means defining the path of said tape via said zone in a manner to dispose said adhesion means in confronting relation to said hub at the point of arrival thereat and serving to press said tape into adhering relation therewith.

18. The tape transport improvement according to claim 17 wherein the last named means includes the drive capstan disposed in pressure transmitting relation to the periphery of the hub and arranged to receive the leader portion of the tape therebetween.

19. In a tape transport of the type adapted to support a length of pliable tape wrapped upon hubs to form supply and take-up rolls, and having a drive capstan disposed between the rolls, the improvement for automatically threading and directing the tape from the supply roll onto the take-up hub comprising adhesion means on a leader portion of the tape and interposed to normally retain the outermost convolution of the roll to the next adjacent convolution, means for releasing the grip of said adhesion means in feeding the leading portion away from the supply roll, the outer terminal portion of said leader portion being characterized by a non-adhering tab portion free to extend naturally from the supply roll, flanges on the capstan for resiliently engaging the edges of said tab portion and carrying same therewith throughout that zone of tape movement extending between the supply and take-up rolls, said capstan being disposed to define the path of said tape via said zone to carry said adhesion means into confronting relation to said hub at the point of arrival thereat and means urging said leader portion into sufficient adhering relation to disengage the edges of said tab portion from said flanges.

20. The tape transport improvement according to claim 19 wherein said tab portion is further characterized by being formed slightly wider than the width of the next adjacent convolution of tape on said supply roll, the width of said tab portion being adapted to increase resilient engagement of the tab portion by said flanges.

21. The tape transport improvement according to claim 19 wherein the last named means includes the drive capstan disposed in pressure transmitting relation to the periphery of the hub and arranged to receive the tab portion of the tape therebetween.

22. In a tape transport of the type adapted to support a length of pliable tape wrapped upon hubs to form supply and take-up rolls, the improvement for automatically threading and directing the leading portion of the tape from the supply roll onto the take-up hub comprising a drive capstan disposed between the rolls and in pressure transmitting relation with each, adhesion means on a leader portion of the tape and interposed to normally retain the outermost convolution of the roll to the next adjacent convolution, means for releasing the grip of said adhesion means in feeding the leader portion away from the supply roll, the outer terminal portion of said leader portion being characterized by a non-adhering tab portion free to extend naturally from the supply roll, flanges on the capstan for resiliently engaging the edges of said tab portion and carrying same therewith throughout that zone of tape movement extending between the supply and take-up rolls, said capstan being disposed to define the path of said tape via said zone to carry said adhesion means into confronting relation to the periphery of said hub at the point of arrival thereat, means defining a protective guide spaced from the periphery of the capstan to define a channel therebetween extending substantially throughout said zone, the guide having a region extending along the channel exposed to confront the path of said adhesion means and formed to accommodate passage of the latter along the channel, and means urging said capstan and take-up hub in pressure transmitting relation to press said leader portion into sufficient adhering relation with the hub to disengage said leader portion from said flanges.

23. In a tape transport of the type adapted to support a length of pliable tape wrapped upon hubs to form supply and take-up rolls, the improvement for automatically threading and directing a leader portion of the tape from the supply roll onto the take-up hub comprising a drive capstan disposed between the rolls and in pressure transmitting relation with each, adhesion means on the leader portion of the tape and interposed to normally retain the outermost convolution of the roll to the next adjacent convolution, means for releasing the grip of said adhesion means in feeding the leader portion away from the supply roll, the outer terminal portion of said leader portion being characterized by a non-adhering tab portion free to extend naturally from the supply roll, flanges on the capstan for resiliently engaging the edges of said tab portion and carrying same therewith throughout that zone of tape movement extending between the supply and take-up rolls, said capstan being disposed to define the path of said tape via said zone in a manner disposing said adhesion means into confronting relation to said hub at the point of its arrival thereat, and means forming a wedging surface substantially at the point of arrival of the tab portion at the take-up hub, said wedging surface being disposed and formed to engage that face of said tab portion adjacent said capstan and direct the leader portion toward said hub for adhering engagement therewith, said capstan being disposed to press said adhesion portion against said hub.

24. A recording tape roll of the type employing pliable material, the roll having an information record portion and a leader portion, said roll being further characterized by adhesive means along a strip on the leader portion only and interposed and extending longitudinally between the outermost convolution of the roll and the next adjacent convolution in adhering relation therebetween, the width of said strip being less than said tape to define at least one anti-friction margin adapted to be slidably engaged by a wedging surface in peeling the strip away from said adjacent convolution, the margin being further adapted to slidably engage guiding surfaces for directing the tape to a take-up roll, said strip commencing at a point spaced a relatively short distance rearwardly of the outer end of the roll to form a tab portion unadhered to the roll, said tab portion being free to extend naturally away from the roll.

25. A recording tape roll as in claim 24 adapted to be wrapped upon a hub of predetermined diameter wherein the roll is further characterized by the longitudinal extent of the leader portion, the extent of said leader portion being equal to the circumference of the hub.

26. A recording tape roll comprising a hub, a length of pliable recording tape wrapped on the hub to form a roll, the tape including an information record portion and a leader portion, the leader portion being at the outer end of the tape, said leader portion being characterized by an applied surface layer of material coextensive with the width of the tape thereat to provide uniform thickness to the leader portion, anti-friction marginal surfaces formed along said applied layer of material adapted to slidably engage guiding surfaces therealong, and a pressure sensitive adhesive laterally intermediate said anti-friction margins adapted for attachment to a take-up hub.

27. A recording tape roll comprising a hub, a length of pliable recording tape wrapped on the hub to form a roll, the tape having an information record portion and inner and outer terminal portions, said outer terminal portion being characterized by an anti-friction marginal surface adapted to slidably engage guiding surfaces and adhesion means laterally adjacent said marginal surface and interposed in adhering relation between the outermost and penultimate outermost convolutions of tape wrapped on the hub, the outer terminal portion further including an unadhered tape portion extending from the outer end of the roll of tape for a relatively short distance rearwardly thereof to form a tab portion unadhered to the roll and free to extend naturally away from the roll, said inner terminal portion being characterized by an anti-friction marginal surface adapted to slidably engage guiding surfaces and adhesion means laterally adjacent the last named said marginal surface and interposed in adhering relation between the hub and the innermost convolution of tape wrapped on the hub, the inner terminal portion further including an unadhered tape portion contacting said hub and extending from the inner end of the roll of tape for a relatively short distance along the tap toward the outer end of the tape to form an unadhered tab lying in facial engagement with the hub.

28. A recording tape roll of the type employing pliable material, the roll being characterized by structural strength to retain its physical form without side support, such structural strength being derived from compaction of the convolutions upon each other in a direction radially of the roll, said roll having a tension profile with little to no slope to provide substantially uniform tension in the convolutions of the roll over a major radial extent thereof, the convolutions of tape being compacted sufficiently to be capable of resisting a static weight of at least ten pounds applied to the center of the roll when the roll is supported across chords of the outermost ¼ inch of peripheral margin of the roll without effecting permanent displacement of the center of the roll from the plane of the roll greater than 0.001 inch.

29. A recording tape roll according to claim 28 in which the roll forms an annulus on a hub and has a radial dimension substantially greater than the diameter of the hub.

30. A recording tape roll according to claim 28 wherein the edges of the tape convolutions are evenly laid in registration to each other to form the side of the roll with a surface having a roughness on the order of less than sixty microinches root mean square.

31. For forming a roll of pliable recording tape upon a hub wherein the roll is characterized by its structural strength to retain its physical form without side support, the method comprising the steps of drawing the tape from a supply roll thereof within, at the point of departure of tape from the roll, placing the tape in facial engagement with a resilient annular surface, moving the annular surface continuously substantially with the tape at said point of departure while urging the supply roll and said annular surface together thereat with a predetermined force, attaching the tape to said hub to initiate formation of a take-up roll, placing the tape of the take-up roll in facial engagement with a resilient annular surface, to define the point of arrival of tape upon the take-up roll and moving the last named annular surface and the periphery of the take-up roll continuously in a common direction at the point of arrival while urging them together thereat with a predetermined force greater than the first named force.

32. The method as defined in claim 31 further including the step of maintaining said tape continuously facially engaged across the width thereof by annular surface portions throughout the longitudinal extent of the length of said tape defined between supply and take-up rolls during a substantially complete transfer of the roll of tape to said hub.

33. The method according to claim 31 further including the steps of disposing a smooth registration surface transversely across an edge of the tape at said points of departure and arrival and at said points urging said tape yieldingly thereagainst.

34. For forming a roll of pliable recording tape upon a hub wherein the roll is characterized by its structural strength to retain its physical form without side support, the method comprising the steps of drawing the tape from a supply roll thereof while, at the point of departure of tape from the roll, placing the tape in facial engagement with a resilient annular surface, moving the annular surface continuously substantially with the tape at said point of departure while urging the supply roll and said annular surface together thereat with a predetermined force, attaching the tape to said hub to define a reach of tape extending from said point of departure to said hub, maintaining said reach of tape continuously facially engaged across the width thereof by annular surface portions, one of which is resilient, during a substantially complete transfer of the roll of tape to said hub, and drawing the tape from said resilient one of said annular surface portions onto the take-up roll at the point of arrival of the tape thereto, while, at said point of arrival, moving the last named annular surface portion and the periphery of the take-up roll continuously in a common direction at the point of arrival while urging them together thereat with a predetermined force greater than the first named force.

35. The method according to claim 34 further including the steps of pressing a smooth surface into engagement with the edge of the outermost plurality of tape convolutions at both said points of departure and arrival.

36. In a tape transport of a type adapted to support a length of pliable recording tape wrapped to form supply and take-up rolls, apparatus comprising means for rotatably supporting each of said rolls, annular rotating tape drive means having resilient arcuate surface portions disposed to contact and rotate the supply and take-up rolls to feed tape from the supply to the take-up roll, and means active during the transfer of tape from said supply roll to said take-up roll for developing a greater compressive force between the take-up roll and said surface portions than between said supply roll and said surface portions for tensioning said tape.

37. In a tape transport of a type adapted to support a length of pliable recording tape wrapped to form supply and take-up rolls, means for supporting each of said rolls for rotation, rotatable drive means including a rotating capstan adapted to support and feed tape from such supply roll to the take-up roll, said drive means further including annular rotating resilient bodies respectively interposed between said supply roll and said capstan and between said take-up roll and said capstan, means supporting said bodies to move in continuous contact with said capstan and said rolls notwithstanding changing roll diameters, and means for urging the first named one of said bodies into capstan engagement with a first compressive force and for urging the second named one of said bodies into capstan engagement with a second compressive force greater than said first force during transfer of tape from said supply roll to said take-up roll.

References Cited

UNITED STATES PATENTS

| | | | |
|---|---|---|---|
| 2,374,038 | 4/1945 | Ress | 242—55.13 |
| 2,657,871 | 11/1953 | Pettus | 242—55.13 |
| 2,915,357 | 12/1959 | Barkley | 346—74 |
| 3,084,884 | 4/1963 | Panzer | 242—74 |

LEONARD D. CHRISTIAN, *Primary Examiner.*